(12) United States Patent
Seager et al.

(10) Patent No.: US 8,161,055 B2
(45) Date of Patent: Apr. 17, 2012

(54) FILTER EXTRACTION IN A SERVICE REGISTRY ENVIRONMENT

(75) Inventors: David J. Seager, Winchester (GB); Martin J. Smithson, Wherwell (GB)

(73) Assignee: International Business Machines Corporation, Armonk, NY (US)

( * ) Notice: Subject to any disclaimer, the term of this patent is extended or adjusted under 35 U.S.C. 154(b) by 863 days.

(21) Appl. No.: 12/238,777

(22) Filed: Sep. 26, 2008

(65) Prior Publication Data

US 2010/0082619 A1  Apr. 1, 2010

(51) Int. Cl.
*G06F 7/00* (2006.01)
(52) U.S. Cl. ...................................................... 707/754
(58) Field of Classification Search .................. 707/709, 707/710, 736, 754
See application file for complete search history.

(56) References Cited

U.S. PATENT DOCUMENTS

| | | | | |
|---|---|---|---|---|
| 5,815,703 A * | 9/1998 | Copeland et al. ..................... | 1/1 |
| 7,236,972 B2 * | 6/2007 | Lewak et al. .......................... | 1/1 |
| 7,409,707 B2 * | 8/2008 | Swander et al. ................. | 726/13 |
| 7,558,917 B2 * | 7/2009 | Madan et al. ................. | 711/118 |
| 2004/0193673 A1 * | 9/2004 | Samji et al. .................... | 709/200 |
| 2004/0199539 A1 * | 10/2004 | Richardson et al. .......... | 707/102 |
| 2005/0044353 A1 * | 2/2005 | Pudipeddi et al. ............. | 713/155 |
| 2005/0091174 A1 | 4/2005 | Akkiraju et al. | |
| 2006/0177198 A1 * | 8/2006 | Jarman et al. .................... | 386/95 |
| 2006/0200466 A1 * | 9/2006 | Kaasten et al. ................... | 707/7 |
| 2006/0248062 A1 * | 11/2006 | Libes et al. ........................ | 707/3 |
| 2006/0294069 A1 * | 12/2006 | Carlson et al. .................... | 707/3 |
| 2007/0261066 A1 | 11/2007 | Miyamoto et al. | |
| 2007/0300240 A1 | 12/2007 | Viegener et al. | |
| 2008/0052113 A1 * | 2/2008 | Cauley et al. ...................... | 705/2 |
| 2008/0313572 A1 * | 12/2008 | Waldman et al. ............. | 715/854 |
| 2009/0030786 A1 * | 1/2009 | Rosler et al. .................... | 705/14 |

* cited by examiner

*Primary Examiner* — Robert Timblin
(74) *Attorney, Agent, or Firm* — Cantor Colburn LLP

(57) ABSTRACT

A method for filter extraction in a service registry includes receiving a user's request in a registry for a list of items in the registry; generating a set of item results by the registry; passing the item results from the registry to a framework; retrieving a list of filter providers by the framework; determining whether all of the filter providers have been used; wherein if all have been used: displaying a list that includes a filter provider title, and one or more filters for each filter provider; wherein if all the filter providers have not been used: retrieving the next filter provider; calling the next filter provider; passing the item results to the next filter provider; determining which filters are applicable based on metadata of the item results; generating a list of applicable filters by the next filter provider; passing the list of applicable filters back to the framework.

4 Claims, 8 Drawing Sheets

| <<Java Class>> FacetProvider |
|---|
| FacetProvider ( ) |
| getName ( ) |
| getTitleMessage ( ) |
| setTitleMessage ( ) |
| getFacets ( ) |
| getFacets ( ) |
| getFacet ( ) |
| getWeight ( ) |
| applyFacet ( ) |
| removeFacet ( ) |
| extractFacets ( ) |
| getFacetType ( ) |
| setWeight ( ) |
| isSDOTypeFaceted ( ) |
| isUseTitleMessage ( ) |
| toString ( ) |

FIG. 1

FILTER EXTRACTION IN A SERVICE REGISTRY ENVIRONMENT

BACKGROUND

This invention relates generally to service oriented architectures, and more particularly to a system, article, and method for consistently and dynamically mapping and maintaining a customized method set of tags particular to an extension point.

Service Oriented Architecture (SOA) is a development of distributed computing and modular programming in which existing or new technologies are grouped into autonomic systems. SOAs employ software services to build applications. Services are relatively large, intrinsically unassociated units of functionality with externalized service descriptions. SOAs typically implement functionalities most humans would recognize as a service, such as filling out an online application for an account, viewing an online bank statement, or placing an online booking or airline ticket order. Thus, SOA serves to align business and information technology (IT).

In an SOA environment, instead of services embedding calls to each other in their source code, protocols are defined that describe how one or more services may talk to each other. In an SOA environment, one or more services communicate with one another by passing data from one service to another, or coordinate an activity between one or more services. In addition, independent services may be accessed without the knowledge of the underlying platform implementation. In this manner, autonomic services may be orchestrated into higher-level services. In SOA, the application architecture has all its functions and services defined using a description language having invokable interfaces that are called to perform business processes. In SOA, each interaction is independent of each and every other interaction, and the interconnect protocols of the communicating devices (i.e., the infrastructure components that determine the communication system do not affect the interfaces). Because interfaces are platform-independent, a client from any device using any operating system in any language may use the service.

A current challenge in SOA development is to build business driven composite services atop of autonomic informational services. By defining a methodology for the use and re-use of software services and business processes, which typically encompass multiple service invocations, SOA has the potential to provide a great deal of flexibility and cost savings to enterprises that rely on information technology (IT).

The SOA concept is based upon an architectural style that defines an interaction model between three primary building blocks: a) a service provider, which publishes a service description and provides the implementation for the service; b) a service requester, which can either use the uniform resource identifier (URI) for the service description directly, or find the service description in a service registry and bind and invoke the service; and c) a service broker, which provides and maintains the service registry using, for example, the Universal Description Discovery and Integration (UDDI) specification, which defines a way to publish and discover information about web services.

A web service is a software application designed to support interoperable machine-to-machine interaction over a network, and is frequently simple web application program interfaces (API) that may be accessed over a network, such as the Internet, and executed on a remote system hosting the requested services. Web services may provide an example of an SOA implementation in which the basic unit of communication is a message, rather than an operation, by making functional building blocks accessible over standard Internet protocols that are independent from platforms and programming languages.

WebSphere® is an SOA software offering of International Business Machines Corporation (IBM). WebSphere is designed to set up, operate, and integrate electronic business (e-business) applications across multiple computing platforms using Java-based Web technologies. Electronic business methods enable companies to link their internal and external data processing systems more efficiently and flexibly, to work more closely with suppliers and partners, and to better satisfy the needs and expectations of their customers. WebSphere® includes both the run-time components, such as WebSphere® Application Server (WAS), and the tools to develop applications that will run on WAS.

While service oriented architecture (SOA) has the potential to drive business agility, business-process vitality, reuse of existing services, improved connectivity and closer alignment of information technology (IT) to business, making the most of SOA potential depends on how well the services are governed and managed in an SOA. Businesses without proper governance and management risk losing control over their services, and face barriers to reusing services, such as redundant services, misalignment with business processes, and lack of application consistency and integrity.

IBM's WebSphere® Service Registry and Repository (WSRR) provides management and governance capabilities that enable an enterprise to get the most business value from their SOA. WSRR facilitates storing, accessing and managing service information, called service metadata, so that users can easily select, invoke, govern and reuse their services.

The publish and find capabilities of WebSphere® Service Registry and Repository promote service reuse in SOA projects by providing greater visibility of and easier access to existing services. A Service discovery engine discovers services on both IBM WebSphere® Application Server and Microsoft®.NET platforms, allowing an enterprise to keep an accurate record of deployed services in their SOA. Faceted search provides a natural and user-friendly way to find services by allowing a user to progressively refine search results using attributes, document types or classification. The WebSphere® Service Registry and Repository helps in rapidly creating or modifying business processes using existing services. WSRR has a query mechanism that allows a user to search and find the services that best fit the requirements of a given process.

WebSphere® Service Registry and Repository enables dynamic and efficient access to services information by both runtime applications and processes that facilitate better connectivity and efficiency. WSRR increases runtime flexibility of applications integrated by an enterprise service bus (ESB) by enabling selection of services based on service metadata. WSRR manages the service metadata, as well as service interactions, dependencies and redundancies. WSRR classifies services based on business objectives, manages policies for service usage, and monitors how services are changed and versioned. WSRR also links related binary documents (such as Microsoft Word and Adobe Portable Document Format (PDF) files to service metadata. The linkage capability provided by WSRR helps optimize the use of services in an SOA by exchanging rich service metadata with runtime monitoring tools and operational data stores.

SUMMARY

Embodiments of the present invention provide a method for filter extraction in a service registry, the method includes:

receiving a user's request in a registry for a list of items in the registry; generating a set of item results by the registry; passing the set of item results from the registry to a framework; retrieving a list of enabled filter providers by the framework; determining whether all of the enabled filter providers have been used; wherein in the event all the enabled filter providers have been used: displaying a list that includes a filter provider title, and one or more filters for each enabled filter provider; wherein in the event all the enabled filter providers have not been used: retrieving the next enabled filter provider; calling the next enabled filter provider; passing the item results from the framework to the next enabled filter provider; determining which filters are applicable based on metadata of the item results; generating a list of applicable filters by the next enabled filter provider; and passing the list of applicable filters back to the framework.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 is a unified modeling language (UML) diagram of a FacetProvider abstract base class within a WSRR according to embodiments of the invention.

Figure 2:
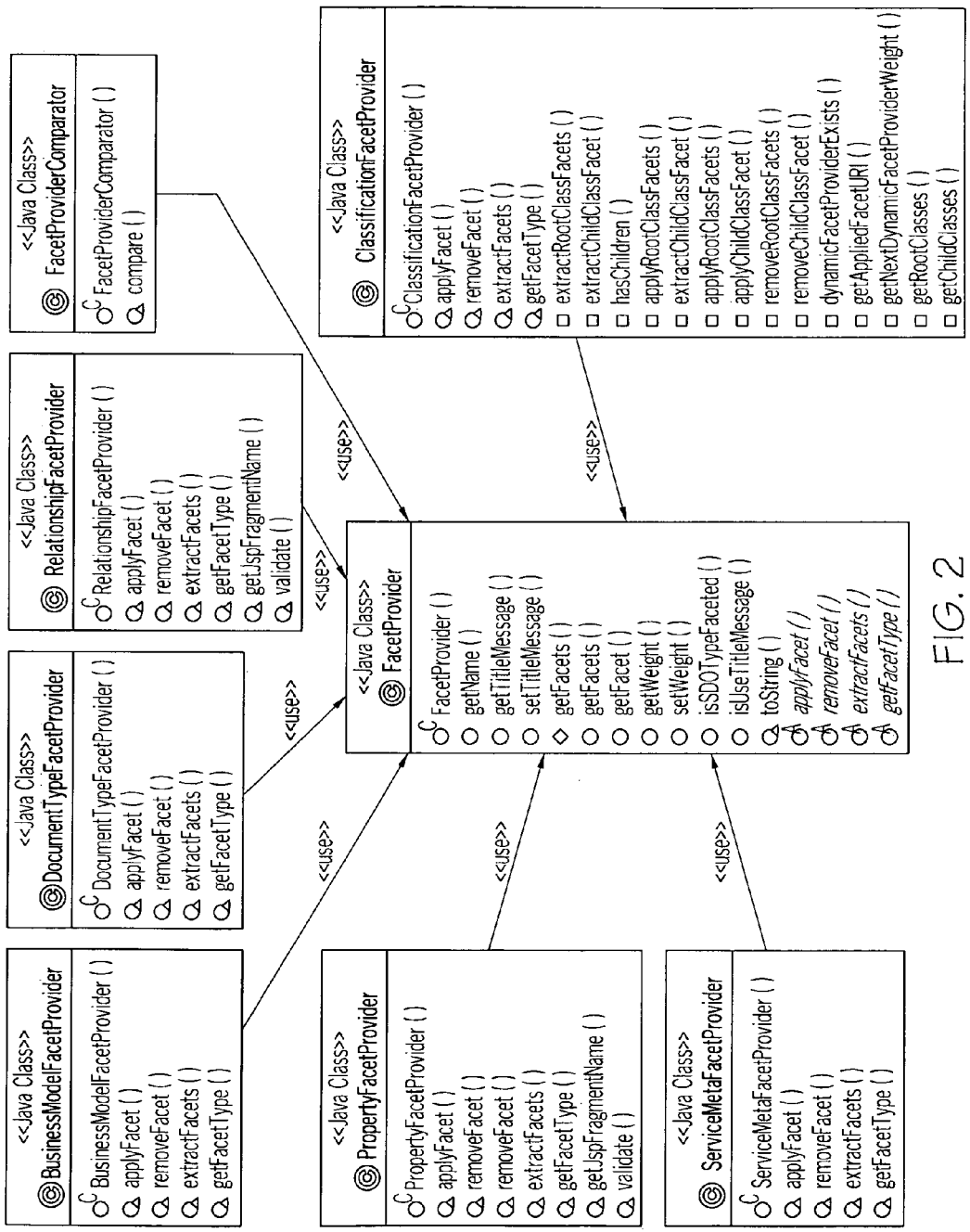
FIG. 2 is a UML diagram that illustrates facet provider implementations as provided by a WSRR according to embodiments of the invention.

The detailed description explains the preferred embodiments of the invention, together with advantages and features, by way of example with reference to the drawings.

DETAILED DESCRIPTION

Presently there are a number of applications that provide users with the ability to refine a collection of items by applying cumulative filters to the collection. As each filter is applied the number of items in the collection is gradually reduced as the elements in the collection that do not match the filter are removed. When presented with a large collection of items this filtering technique allows users to 'drill down' to find the item or items that they are interested in. An example of such an application is the web based user interface for IBM's Rational Asset Manager (RAM). RAM is a collaborative software development asset management solution that supports the Reusable Asset Specification (RAS) and enables organizations to identify, manage and govern the design, development and consumption of software assets, including services as part of a SOA initiative.

Traditionally, the functionality to refine a collection of items with filters has been implemented in one of two approaches. In the first approach, the filters that are presented to a user are static and do not necessarily reflect the content of the result set. The problem associated with the first approach is that filters may be presented to the user that do not match any of the elements in the result set. Selecting such a filter would reduce the result set to zero elements and is, therefore, not particularly helpful. In the second approach, an algorithm that extracts the filters from the result set is implemented as a single, monolithic, process or function. The problem with the second solution is that the filters may be based on various attributes of the items in the result set. Adding a new type of filter to the application would require changes to the application code and is, therefore, not a flexible solution.

Embodiments of the invention provide a method and system that filter web service definitions, as well as other types of information that may be stored in a service registry. The filters provided by embodiments of the invention execute within the service registry itself, and are centrally located within the service registry, and are not provided as add-ons to the web service itself. The filters provided by embodiments of the invention operate on metadata that is associated with artifacts in the service registry in order to refine the collection of artifacts.

Embodiments of the invention define a framework for various types of filter providers to be registered with an application declaratively. In embodiments of the invention, in the event an application is displaying a collection of objects (usually as the result of a search), the invention embodiment delegates responsibility for extracting the filters from the objects to each of the registered filter providers. Each filter provider is configured to inspect each of the objects and generate filters of a specific type. For example, a Classification Filter Provider will inspect the classifications for each object, and generate one or more classification based filters for display, while a Document Type Filter Provider will inspect the type of each object and generate document type based filters (if appropriate).

The filter provider approach, of embodiments of the invention, is advantageous in that it enables different types of filter providers to be registered with an application without requiring changes to any of the application code. Applying embodiments of the invention in a WebSphere® Service Registry and Repository, enables the registration of different filter providers on different perspectives within a web user interface, customizing each perspective to the specific needs of the user role using the perspective. For example, for a Business Analyst perspective, WSRR may be configured to only display Business Model and Classification based filters, since these filter providers use the terminology that a Business Analysts would understand. Alternatively, for a Developer perspective, WSRR may be configured to display additional filters, such as Document Type, Service Metadata Type, Property Type, and Relationship Type filters.

The framework, provided by embodiments of the invention, defines a common abstract base class for all filter provider implementations. In a WebSphere® Service Registry and Repository implementation of embodiments of the invention, the filter providers are referred to as facet providers. The defined abstract base class implements some key functionality that is common to all filter providers, while also defining a number of abstract methods that each filter provider must implement. These methods provide the 'hooks' that allow WebSphere® Service Registry and Repository to invoke each filter provider at the relevant point when processing a collection of objects (this includes applying/removing a filter to/from a collection of objects as well as extracting the filters for display).

FIG. 1 is a unified modeling language (UML) diagram of a FacetProvider abstract base class within a WSRR according to embodiments of the invention. Unified modeling language is a standardized general-purpose modeling language in the field of software engineering. UML includes a set of graphical notation techniques to create abstract models of specific systems, referred to as UML model. The graphical nature of UML aids in the visualizing, specifying, constructing, and documenting the artifacts of a software-intensive system. The unified modeling language offers a standard way to write a system's blueprints, including conceptual things such as business processes and system functions as well as concrete things such as programming language statements, database schemas, and reusable software components.

FIG. 2 is a UML diagram that illustrates facet provider implementations as provided by a WSRR according to embodiments of the invention.

The framework, provided by embodiments of the invention, also defines an extensible markup language (XML) schema definition that is used to declaratively define Facet Providers to the WSRR. XML files that conform to the XML schema are created and placed in a specific sub-directory within a WSRR web user interface module. Each facet provider that is required to be registered with WSRR must provide its own XML configuration file and place it in this sub-directory. An example of a Facet Provider XML configuration file is shown in Table 1.

TABLE 1

<facet-provider-definition
xmlns="http://www.ibm.com/xmlns/prod/serviceregistry/6/1/
FacetProviderDefinition"
xmlns:xsi="http://www.w3.org/2001/XMLSchema-instance"
xsi:schemaLocation="http://www.ibm.com/xmlns/prod/serviceregistry/
6/1/FacetProvider
Definition ../../../schemas/FacetProviderDefinition.xsd"
facet-provider-name="DocumentTypeFacetProvider"
page-help-topic="detail.view.wsdl"
weight="4">
<messages>
<title-message message-key="facet.provider.document.type.title"/>
</messages>
<facet-provider-class>com.ibm.sr.ui.facetproviders.-
DocumentTypeFacetProvider</facet-provider-class>
</facet-provider-definition>

Figure 3:
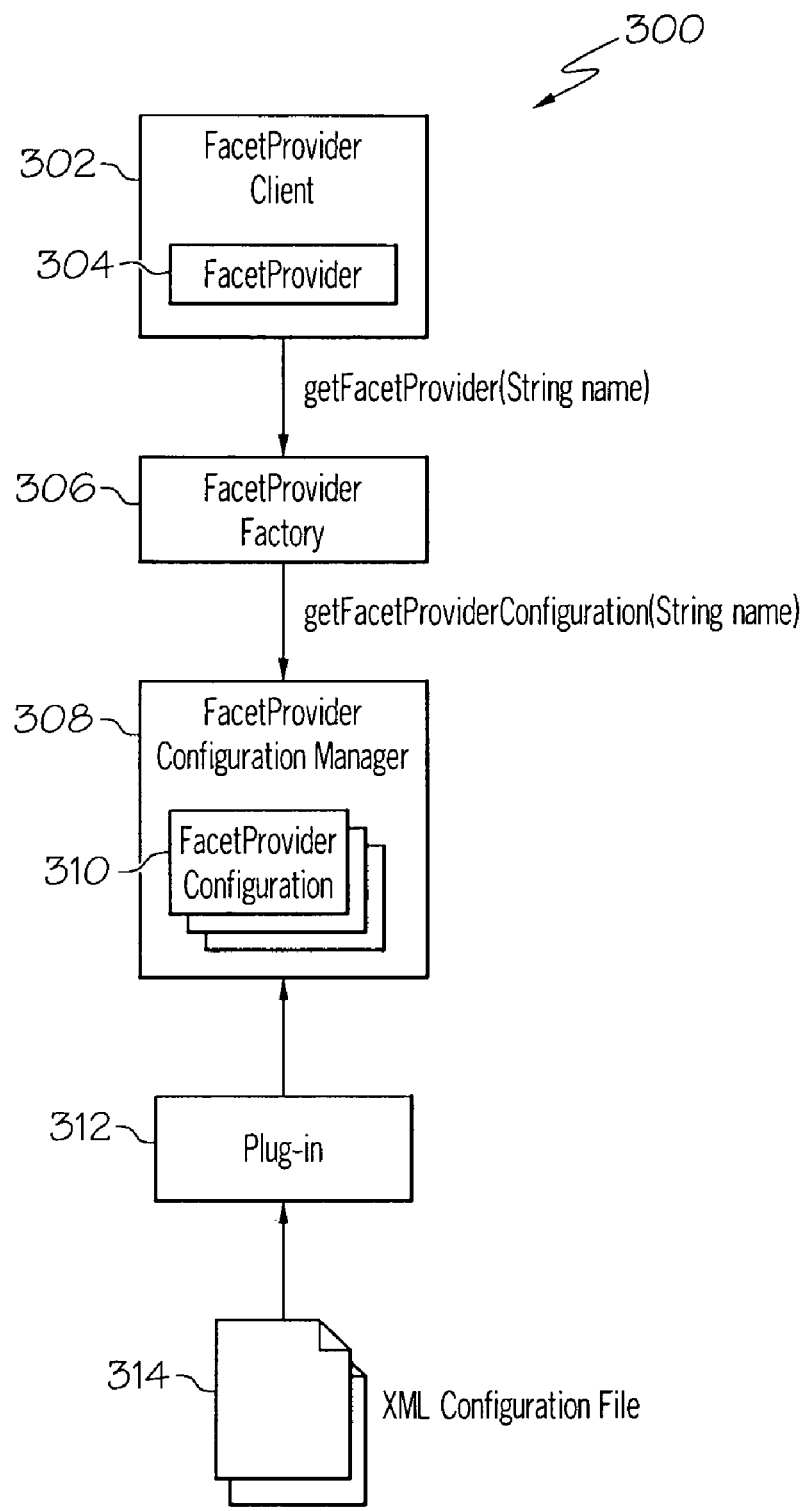
FIG. 3 is a functional block diagram illustrating a WSRR during application startup according to embodiments of the invention.

FIG. 3 is a functional block diagram illustrating a WSRR 300 during application startup according to embodiments of the invention. In embodiments of the invention during application startup, the WSRR web user interface initialization code 312 reads each Facet Provider configuration file 314 and generates an in memory representation of the information, called a FacetProviderConfiguration 310. A FacetProviderConfigurationManager class 308 manages all of the FacetProviderConfigurations 310 that are registered with WSRR 300. When a component within the WSRR web user interface 302 is required to invoke a Facet Provider 304, the component requests the FacetProvider 304 from a FacetProviderFactory class 306. This class requests the relevant FacetProviderConfiguration object 310 from the FacetProviderConfigurationManager class 308 and uses it to dynamically create a Facet Provider implementation class. Once the FacetProviderFactory 306 has created an instance of a Facet Provider implementation class, it is cached within the factory class.

Figure 4:
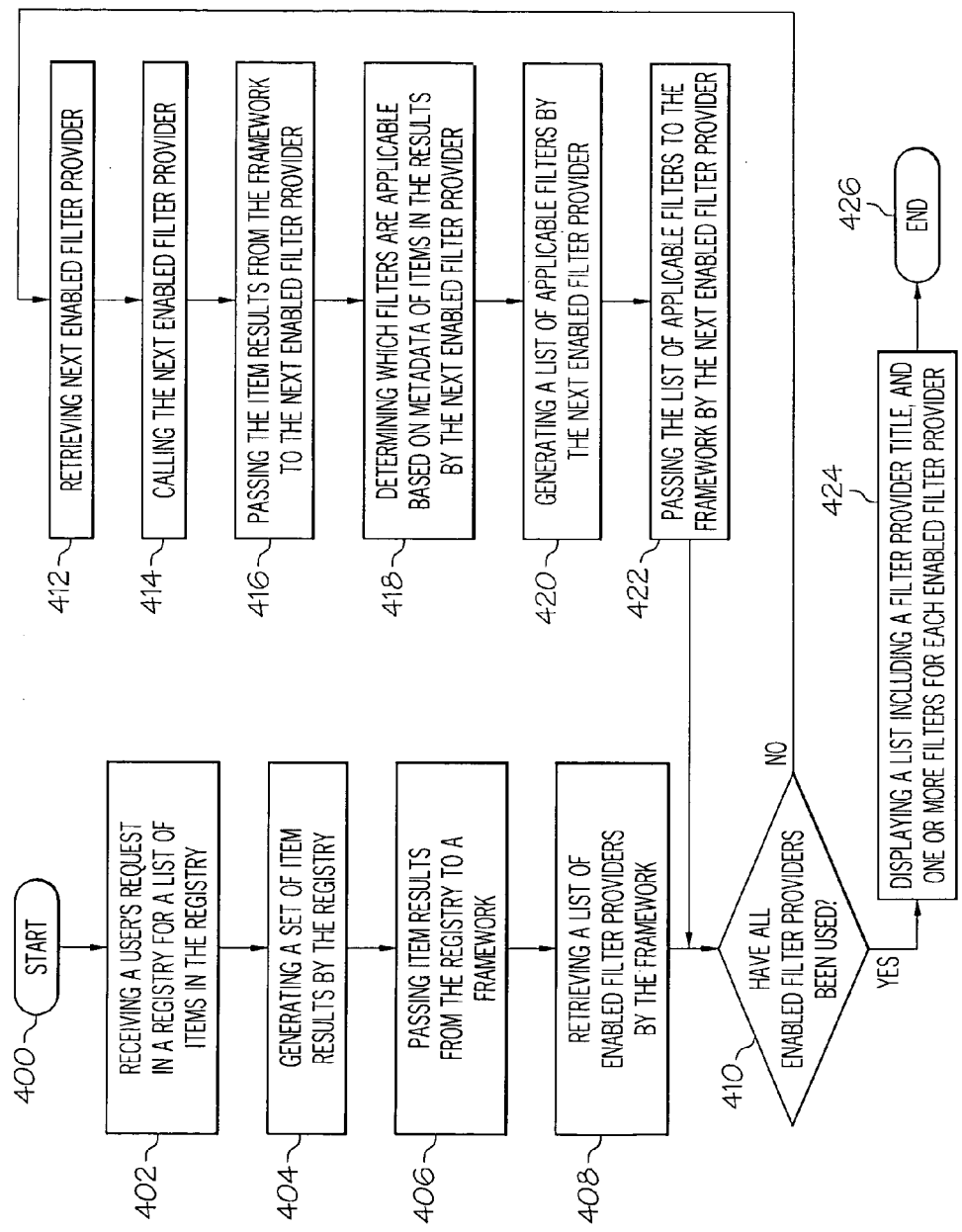
FIG. 4 is a flow diagram illustrating a process flow for extracting filters in a service registry according to embodiments of the invention.

FIG. 4 is a flow diagram illustrating a process flow for extracting filters in a service registry according to embodiments of the invention. In the process for extracting filters in a registry the process starts (block 400) with a user requesting a list of items within a registry (block 402), and the registry generating a set of item results (block 404). The registry passes the item results to a framework (block 406), and the framework retrieves a list of enabled filter providers (block 408). A determination is made of whether all the enabled filter providers have been used (decision block 410). In the event all of the enabled filter providers have not been used (decision block 410 is No), the next enabled filter provider is retrieved (block 412), and a call is placed to the next enabled filter provider (block 414). The item results are then passed from the framework to the next enabled filter provider (block 416), and the next enabled filter determines which filters are applicable based on metadata of the item results (block 418), and a list of applicable filters is generated by the next enabled filter (block 420). The list of applicable filters is then passed back to the framework by the next enabled filter (block 422), and another determination is made whether all the enabled filter providers have been used (decision block 410). However, in the event all the enabled filter providers have been used (decision block 410 is Yes), a list is displayed that includes a filter provider title, and one or more filters for each enabled filter provider (block 424), and the process concludes (block 426).

Figure 5:
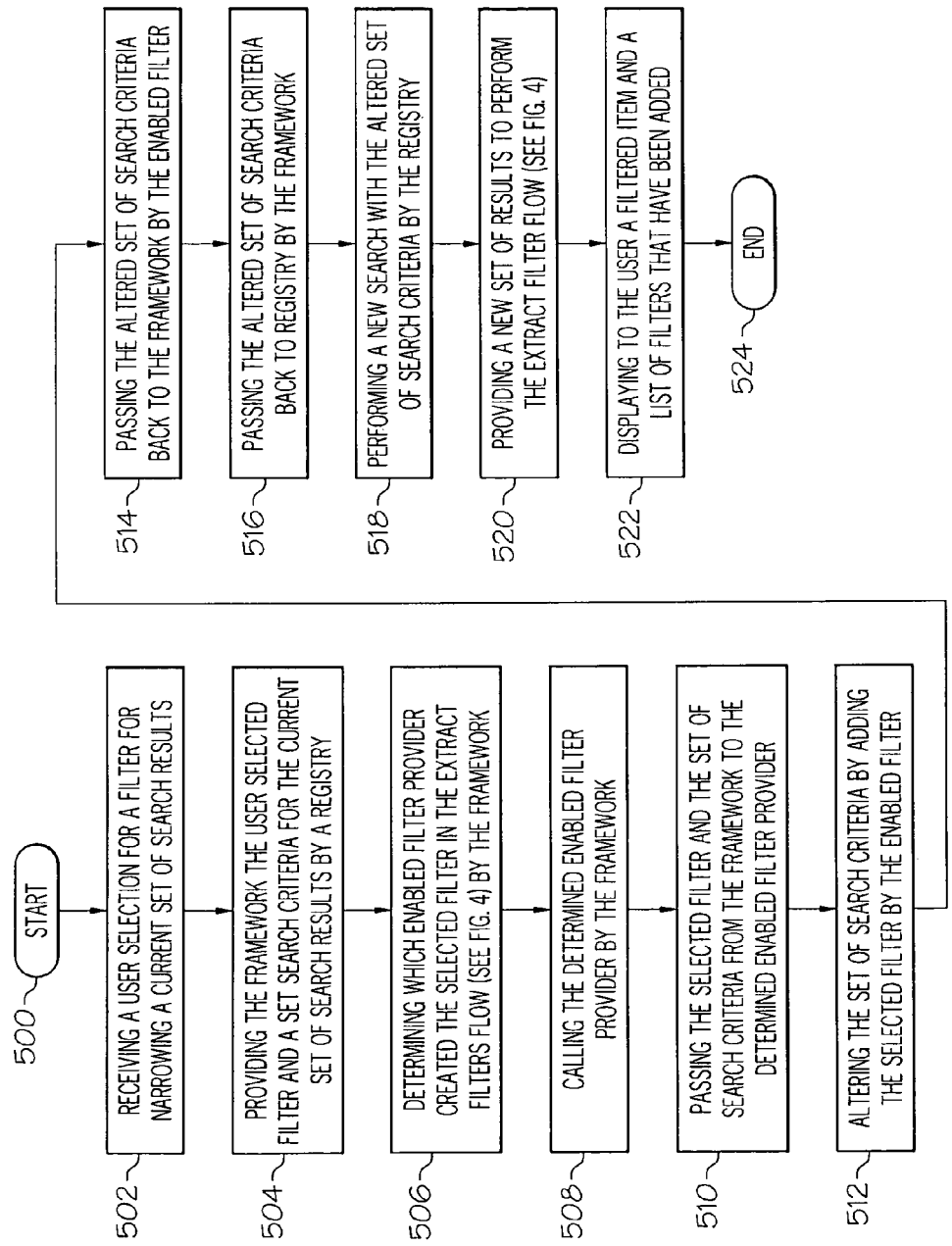
FIG. 5 is a flow diagram illustrating a process flow for filtering with a user specified filter in a service registry according to embodiments of the invention.

FIG. 5 is a flow diagram illustrating a process flow for filtering with a user specified filter in a service registry according to embodiments of the invention. In the process for filtering with a user specified filter in a registry the process starts (block 500) with a user selecting a filter for narrowing a current set of search results in a registry (block 502), and the registry providing the framework a user selected filter and a set search criteria for the current set of search results (block 504). The framework makes a determination of which enabled filter provider created the selected filter in the extract filters flow process (see FIG. 4) (block 506), and calls the determined enabled filter provider (block 508). Subsequently, the framework passes the selected filter and the set of search criteria to the determined enabled filter provider (block 510). The determined enabled filter alters the set of search criteria by adding the selected filter (block 512), and passes the altered set of search criteria back to the framework (block 514). Subsequently, the framework passes the altered set of search criteria back to the registry (block 516), and the registry performs a new search with the altered set of search criteria (block 518). A new set of search results are then provided to perform the extract filters flow process (see FIG. 4) (block 520) resulting in a filtered item and a list of filters that have been added are displayed to the user (block 522), and the process concludes (block 524).

Figure 6:
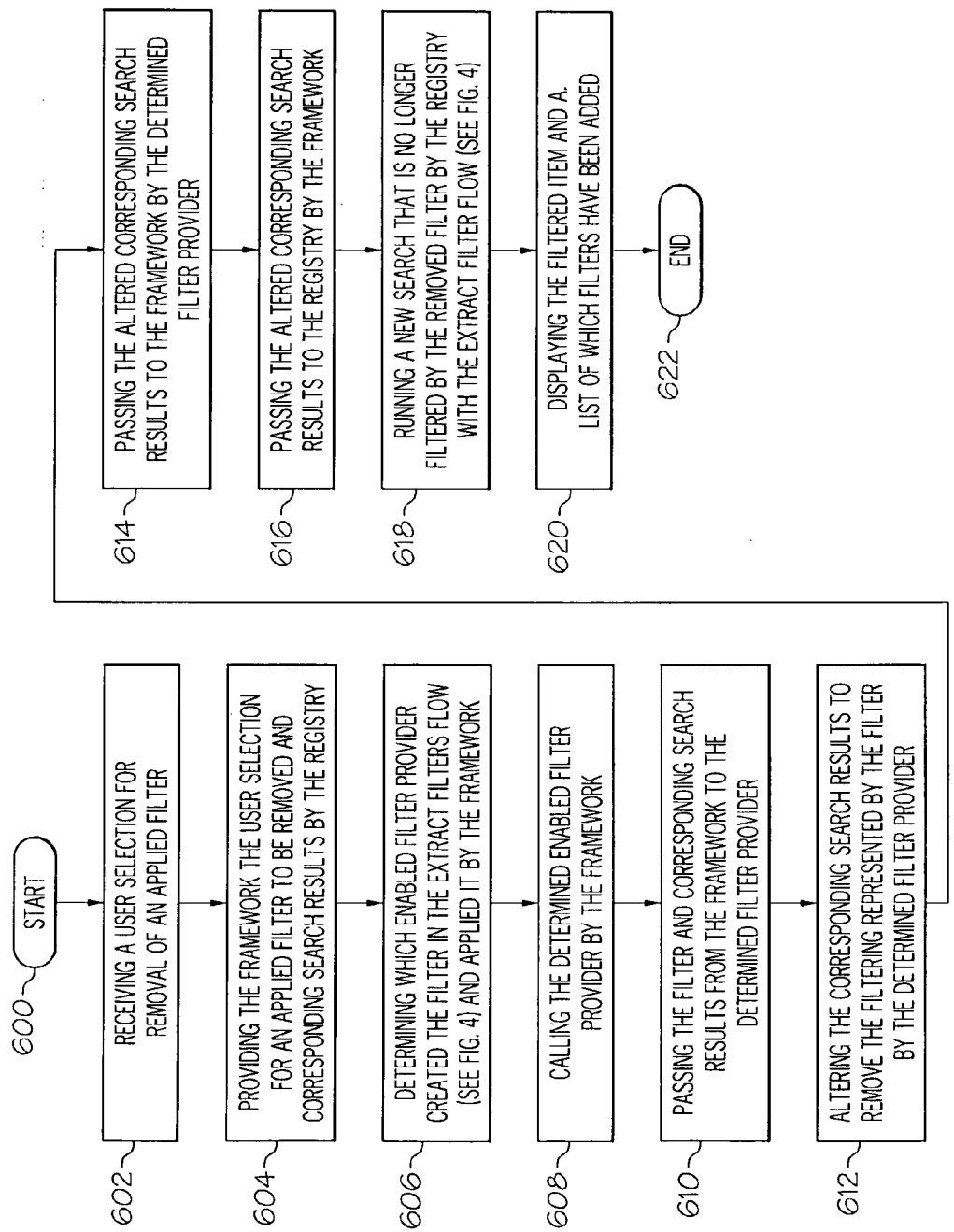
FIG. 6 is a flow diagram illustrating a process flow for removing a previously added filter in a service registry according to embodiments of the invention.

FIG. 6 is a flow diagram illustrating a process flow for removing a previously added filter in a service registry according to embodiments of the invention. In the process for removing a previously added filter in a registry the process starts (block 600) with a user selecting a filter for removal from a list of filters that have been applied (block 602), and the registry providing the framework the user selected filter and corresponding search results (block 604). The framework determines which enabled filter provider created and applied the filter with the extract filters flow process (see FIG. 4) (block 606). Subsequently, the framework calls the determined enabled filter (block 608), and passes the filter and corresponding search results to the determined filter provider (block 610). The determined filter provider alters the corresponding search results to remove the filtering represented by the filter (block 612), and passes the altered corresponding search results to the framework (block 614). The framework passes the altered corresponding search results to the registry (block 616). The registry runs a new search that is no longer filtered by the removed filter with the extract filter flow (see FIG. 4) (block 618). Subsequently, the filtered item and a list of which filters have been added are displayed (block 620), and the process concludes (block 622).

Figure 7:
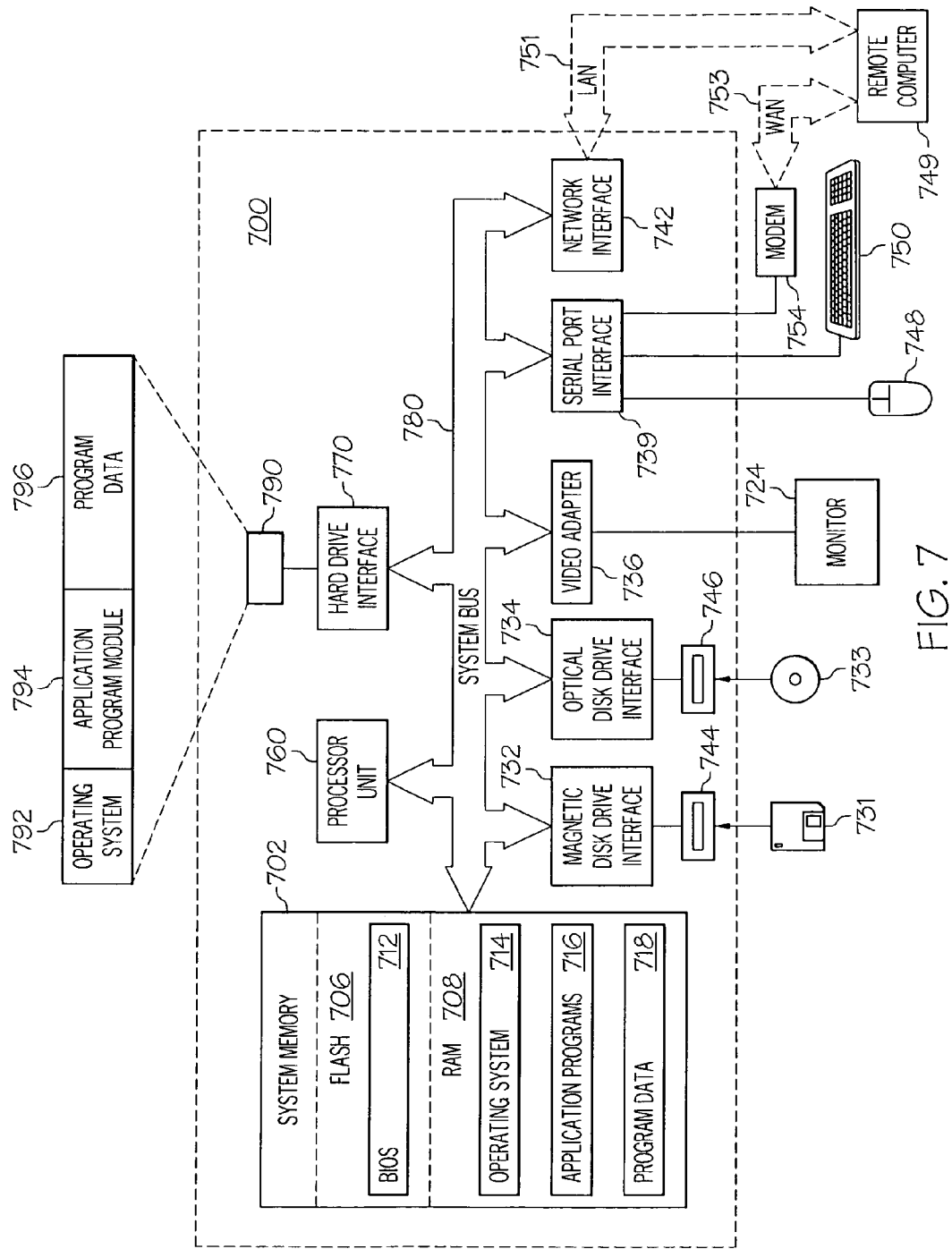
FIG. 7 is a block diagram illustrating an exemplary computer system that may be utilized to implement exemplary embodiments of the invention.

FIG. 7 and the following discussion are intended to provide a general description of an exemplary data processing system that may be adapted to implement exemplary embodiments of the invention. While exemplary embodiments of the invention will be described in the general context of an application program that runs on an operating system in conjunction with a personal computer, those skilled in the art will recognize that exemplary embodiments may also be implemented in combination with other program modules such as, for example, platform software modules, user-written software modules (such as spreadsheet templates, word processor macros, graphics scripts, etc.), routines, programs, components, data structures, etc. that perform particular tasks or implement particular abstract data types. Moreover, those skilled in the art will appreciate that exemplary embodiments of the invention may be practiced with other computer system configurations, including hand-held devices, multiprocessor systems, microprocessor-based or programmable consumer electronics, minicomputers, mainframe computers, and the like, as well as in distributed computing environments where tasks are performed by remote processing devices that are linked through a communications network. In a distributed computing environment, program modules may be located in both local and remote memory storage devices.

Referring now to FIG. 7, there is depicted an exemplary data processing system 700 that may be utilized to implement exemplary embodiments of the present invention. For discussion purposes, the data processing system is described as having features common to a personal computer, such as a desktop or portable computer. As used herein, however, the terms "data processing system," "computer," and the like are intended to mean essentially any type of computing device or machine that is capable of receiving, storing, and running a software product, including such devices as communication devices (for example, pagers, telephones, electronic books, electronic magazines and newspapers, etc.) and personal and home consumer devices (for example, handheld computers, web-enabled televisions, home automation systems, multimedia viewing systems, gaming consoles, etc.).

Data processing system 700, as provided in FIG. 7, is configured as a personal computer that generally includes a processing unit 760, a system memory 702, and a system bus 780 that couples system memory 702 to processing unit 760. The system memory 702 includes flash memory 706 and random access memory (RAM) 708. Flash memory 706 is an electrically erasable programmable read only memory (EEPROM) module that includes a basic input/output system (BIOS) 712. BIOS 712 contains the basic routines that facilitate transfer of information between elements within personal computer 700, such as during start-up.

Data processing system 700 further includes a hard disk drive 790, a magnetic disk drive 744 (which can be used to read from or write to a removable disk 731), and an optical disk drive 746 (which can be used to read a CD-ROM disk 733 or read or write to other optical media). Hard disk drive 790, magnetic disk drive 744, and optical disk drive 746 are electrically communicatively coupled to system bus 780 by a hard disk drive interface 770, a magnetic disk drive interface 732, and an optical drive interface 734, respectively. The drives and their associated computer-readable media provide non-volatile storage for data processing system 700. Although the description of computer-readable media above refers to a hard disk, a removable magnetic disk and a CD-ROM disk, it should be appreciated that other types of media that are readable by a computer, such as magnetic cassettes, flash memory cards, digital video disks, Bernoulli cartridges, and the like, may also be used in exemplary computer operating environments.

A number of program modules may be stored in the drives and RAM 708, including an operating system 714 (or 792 for hard drive 790), application program modules 716 (or 794 for hard drive 790) (such as, for example, word processors, design applications, and IBM's Workplace Forms suite of program modules), and program data 718 (or 796 for hard drive 790). A user may enter commands and information into data processing system 700 through a keyboard 750 and a mouse 748. Other input devices (not shown) may include, for example, a microphone, joystick, game pad, satellite dish, scanner, or the like. These and other input devices are often connected to processing unit 760 through a serial port interface 739 that is coupled to system bus 780, but may be connected by other interfaces, such as a game port or a universal serial bus (USB). A monitor 724 or other type of display device is also connected to system bus 780 via an interface, such as a video adapter 736. In addition to the monitor, the exemplary computer operating environment may also include other peripheral output devices (not shown), such as speakers or printers.

Data processing system 700 may operate in a networked environment using logical connections to one or more remote computers, such as a remote computer 749. Remote computer 749 may be, for example, a server, a router, a peer device, or another common network node, and may include many or all of the elements described in relation to data processing system 700. The logical connections depicted in FIG. 7 include a local area network (LAN) 751 and a wide area network (WAN) 753.

When used in a LAN networking environment, data processing system 700 is connected to LAN 751 through a network interface 742. When used in a WAN networking environment, data processing system 700 includes a modem 754 or other means for establishing communications over WAN 753, such as the Internet. Modem 754, which may be internal or external to data processing system 700, is connected to system bus 780 via serial port interface 739. In a networked environment, program modules depicted relative to data processing system 700, or portions thereof, may be stored in the remote memory storage device. It will be appreciated that the network connections shown are exemplary and other means of establishing a communications link between the computers may be used.

Exemplary embodiments of the present invention may be implemented in conjunction with an SOA environment such as, for example, an integrated web services implementation, in which the SOA supports integration and consolidation of any number of services and processes. Web services are self-contained, self-describing, modular applications that may be described, located, and invoked over a computer network such as the World Wide Web. Web services utilize standardized interfaces and protocols (for example, a web Application Programming Interface (API)) to implement consolidation and integration methods that allow different entities or web-based applications to communicate data, logic, and processes with one another over a network. These standardized methods permit different applications to exchange resources with other entities or applications that are running on different operating systems. In an SOA environment, the SOA may define a interface through which a service-requesting or client-side party may access web services or enterprise-based services provided within an enterprise domain, specify or consolidate a set of web services or web service providers that may be invoked through the interface, and define protocols for communicating with the set of web services through the SOA interface.

Figure 8:
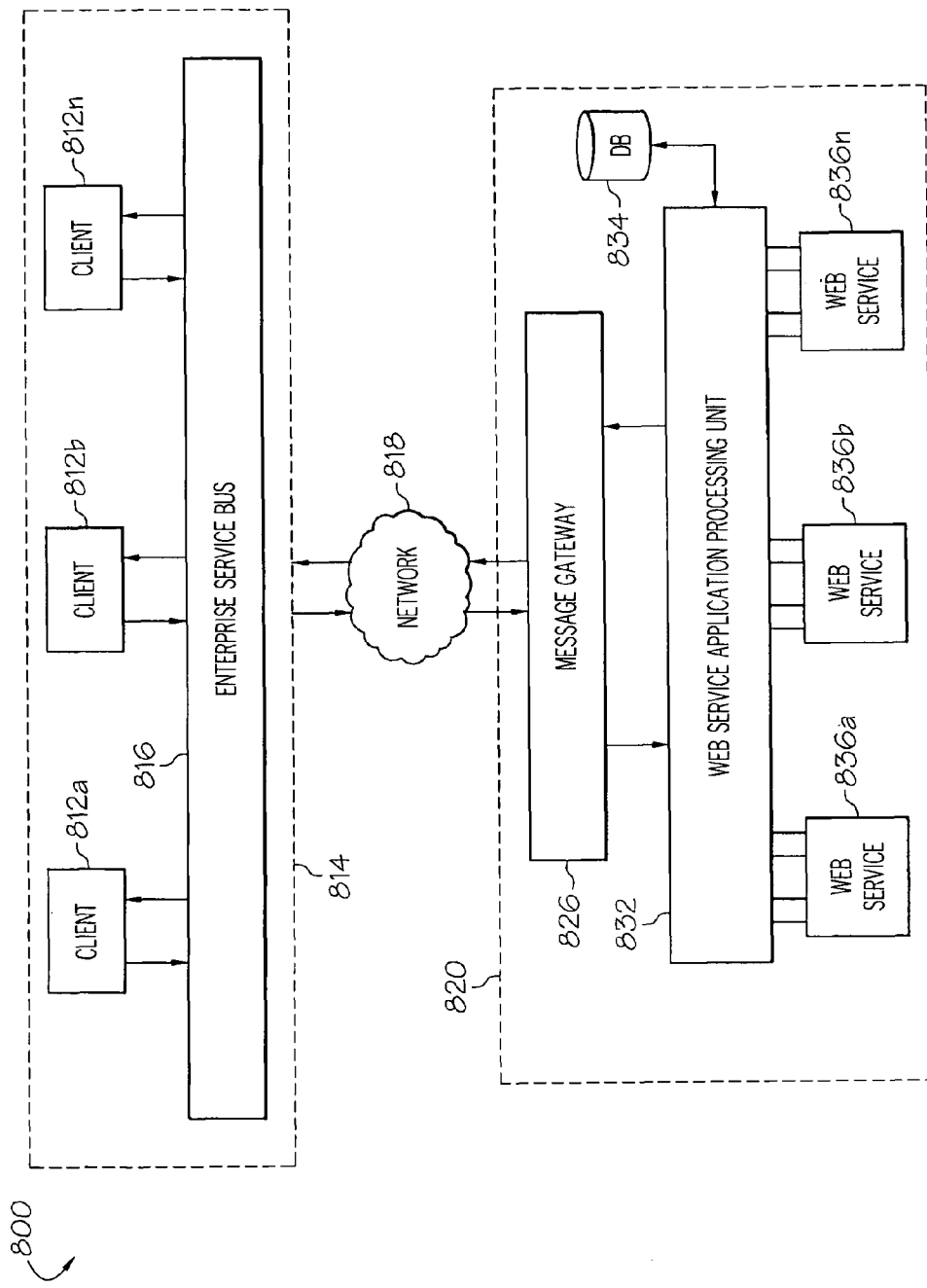
FIG. 8 is a block diagram illustrating an exemplary operational configuration of an SOA web service system for implementing embodiments of the invention.

FIG. 8 is a block diagram illustrating an exemplary SOA web service system 800 within which exemplary embodiments of the invention may be implemented and operated in a collaborative environment such as that of a business enterprise. Web service system 800 allows for the exchange or transport of web service data or web service messages between multiple client applications (812a, 812b-812n) within an enterprise domain 814 to any of multiple web services (836a, 836b-836n) hosted by a web service application server or provider 820 using an enterprise service bus (ESB) 816. In exemplary embodiments, web service system 800 may allow for the exchange or transport of web service data or web service messages between client applications 812 and a number of web service application providers that each host one or more web services over a communications network 818.

Client applications 812 are software applications that include one or more sequences of instructions that are executable by one or more processors. For example, applications 812 may be programs that are executable on a computer system such as the data processing system illustrated in FIG. 7, described above. Web services 836 may include some combination of programming and data that are made available through application server 820 for end users and other network-connected application programs. In exemplary embodiments, web services 836 may comprise one or more web applications that are implemented to allow users of client applications 812 to communicate therewith to create and store folksonomic tags for describing web content such as, for example, digital images or internet bookmarks.

When a client application needs to invoke a remote web service at application server 820, the invoking client application generates a request message describing arguments to be given to the web services, and requests processing by the web services. Upon receiving the request message, application server 820 performs the processing for the requested web services, and returns a response message describing any return values of the processing to the client application.

ESB 816, which is a component of enterprise domain 814 in the present exemplary embodiment, serves to provide an enhanced messaging middleware infrastructure for the enterprise domain and provides the set of capabilities through which the SOA may be implemented. The capabilities provided by ESB 816 may include, for example, invocation, routing, mediation, messaging, mediation, messaging, process choreography, service orchestration, complex event processing, and management functions. In general, ESB 816 serves as a centralized broker that handles issues relating to security, access, and communication in the SOA environment. In exemplary embodiments, ESB 816 may be configured to perform data integration to ensure that information is kept consistent within the SOA environment, provide a common user interface through which client applications 812 may access the web services that are specified by the SOA, and to extract policies or rules from the specified web services so that if one service is replaced with a different vendor's services in the SOA specification, the business rules do not have to be re-implemented. In alternative exemplary embodiments, ESB 816 may be a vendor-provided service bus that is external to enterprise domain 814.

In one particular exemplary capability, ESB 816 serves as a message mediator by receiving, processing, and passing request messages from client applications 812 and response messages from web services 836 such that the services can be called to perform their tasks in a standard way, without the services having foreknowledge of the calling client applications, and without the client applications having or needing knowledge of how the services actually perform their tasks. In exemplary embodiments, the message processing performed by ESB 816 may be built upon generally accepted web services standards and protocols such as, for example, XML (a markup language for describing data in message payloads in a document format), HTTP (or HTTPS, a request/response protocol between clients and servers used to transfer or convey information), SOAP (a protocol for exchanging XML-based messages over a computer network, normally using HTTP), and XACML (a markup language for expressing access control rules and policies).

ESB 816 and web services 836 communicate with each other, as well as with other applications and web service systems, through network 818. Network 818 is configured to receive and pass on request and response messages accordingly, and to use the transportation protocol or protocols used by messages. Network 818 includes intranets, extranets, and the Internet, and may contain any number of network infrastructure elements including routers, switches, gateways, etc. For example, network 818 may be the public Internet or a private LAN. In exemplary embodiments, ESB 816 may also communicate with other web service providers to provide other web services and applications through network 818 to client applications 812, as well as with enterprise service providers through an intranet within enterprise domain 814 that provide other services and processes such as enterprise legacy services to the client application.

Application server 820 provides web services 836 to client applications 812 through network 818. A web server application processing unit 832 (such as WebSphere®, a product of International Business Machines Corporation) oversees the execution of multiple web services 836a, 836b-836n that reside on application server 820. Network 818 passes each request message to and receives each response message from application processing unit 832 through a message gateway 826 such as, for example, a proxy, firewall, or other message intermediary. Message gateway 826 receives request messages from network 818 and passes response messages to the network. Message gateway 826 performs lexical analysis of request messages to create input objects including parameters for invocation of one or more of web services 836. Message gateway 826 sends input objects to web service application processing unit 832, which calls the appropriate web services that correspond to the method invocation of the input objects, executes the appropriate logic, and returns the result as output objects that include the return values of the invoked web service(s), to the message gateway. Message gateway 826 converts output objects into response messages, and transmits the response messages through network 818 to the invoking client applications.

Application processing unit 832 may also be supported by a database management system 834, which may be any conventional data repository for storing, managing, and retrieving data. In exemplary embodiments, database 834 may be a relational or object-relational database management system, such as DB2, a product of International Business Machines Corporation. In exemplary embodiments, database 834 may be internal to application server 820 (as shown in FIG. 8) or, alternatively, reside externally on a separate machine. In exemplary embodiments, application server 820 may use a single database 834 to serve multiple web services 836 (as shown in FIG. 8) or, alternatively, use a separate database for each separate web service.

The capabilities of the present invention can be implemented in software, firmware, hardware or some combination thereof As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method for filtering with a user specified filter in a service registry, the method comprising:
   receiving a user selection for a filter for narrowing a current set of search results in a registry;
   providing, by the registry, a framework for the user selected filter and a set of search criteria for the current set of search results;
   determining, from a list of enabled filter providers provided by the framework, which enabled filter provider created the selected filter;
   wherein the determining is performed by the framework invoking an extract filters flow process;
   calling the determined enabled filter provider by the framework;
   passing the selected filter and the set of search criteria from the framework to the determined enabled filter provider;
   altering the set of search criteria by adding the selected filter by the enabled filter provider;
   passing the altered set of search criteria back to the framework by the enabled filter provider;
   passing the altered set of search criteria back to the registry by the framework;
   performing a new search with the altered set of search criteria to obtain a new set of search results by the registry;
   providing the new set of search results to the extract filters flow process; and
   displaying to the user a filtered item and a list of filters that have been added.

2. The method of claim 1, wherein the method of the extract filter process comprises:
   receiving the user's request in the registry for a list of items in the registry;
   generating a set of item results by the registry;
   passing the set of item results from the registry to the framework;
   retrieving a list of enabled filter providers by the framework;
   determining whether all of the enabled filter providers have been used;
   wherein in the event all the enabled filter providers have been used;
   displaying a list that includes a filter provider title, and one or more filters for each enabled filter provider;
   wherein in the event all the enabled filter providers have not been used:
   retrieving the next enabled filter provider;
   calling the next enabled filter provider;
   passing the item results from the framework to the next enabled filter provider;
   determining which filters are applicable based on metadata of the item results;
   generating a list of applicable filters by the next enabled filter provider; and
   passing the list of applicable filters back to the framework.

3. A method for removing a previously added, applied filter in a service registry, the method comprising:
   receiving a user selection for removal of the applied filter;
   providing, by the registry, a framework with the user selection for the applied filter to be removed, and corresponding search results;
   determining, from a list of enabled filter providers provided by the framework, which enabled filter provider created and applied the filter in an extract filters process;
   calling the determined enabled filter provider by the framework;
   passing the filter and the corresponding search results from the framework to the determined filter provider;
   altering the corresponding search results to remove the filtering represented by the filter by the determined filter provider;
   passing the altered corresponding search results to the framework by the determined filter provider;
   performing a new search that is no longer filtered by the removed filter by the registry with the extract filters process; and
   displaying a filtered item and a list of which filters have been added.

4. The method of claim 3, wherein the method of the extract filter process comprises:
   receiving the user's request in the registry for a list of items in the registry;
   generating a set of item results by the registry;
   passing the set of item results from the registry to the framework;
   retrieving a list of enabled filter providers by the framework;
   determining whether all of the enabled filter providers have been used;
   wherein in the event all the enabled filter providers have been used:
   displaying a list that includes a filter provider title, and one or more filters for each enabled filter provider;

wherein in the event all the enabled filter providers have not been used:

retrieving the next enabled filter provider;

calling the next enabled filter provider;

passing the item results from the framework to the next enabled filter provider;

determining which filters are applicable based on metadata of the item results;

generating a list of applicable filters by the next enabled filter provider; and passing the list of applicable filters back to the framework.

* * * * *